United States Patent [19]
Prall

[11] 3,756,758
[45] Sept. 4, 1973

[54] EXTRUSION DIE FOR PLASTIC FILM
[75] Inventor: George M. Prall, Barrington, Ill.
[73] Assignee: Chemplex Company, Rolling Meadows, Ill.
[22] Filed: July 15, 1969
[21] Appl. No.: 841,923

[52] U.S. Cl. .................................. 425/197, 425/467
[51] Int. Cl. ............................................. B29f 3/04
[58] Field of Search ............... 18/13 D, 13 P, 13 R, 18/14 G, 14 R, 14 P, 14 S, 12 DM; 264/171, 173, 95; 425/197, 467

[56] References Cited
UNITED STATES PATENTS
| | | | |
|---|---|---|---|
| 2,753,596 | 7/1956 | Bailey | 18/14 P UX |
| 3,296,662 | 1/1967 | Raley | 18/14 G |
| 3,308,508 | 3/1967 | Schrenk | 18/14 P |
| 3,475,789 | 11/1969 | Stroop | 18/14 G |

Primary Examiner—J. Spencer Overholser
Assistant Examiner—David S. Safran
Attorney—Hofgren, Wegner, Allen, Stellman & McCord

[57] ABSTRACT

An extrusion apparatus for producing plastic film and especially blown film that comprises a die having a passage through it with an entrance and an annular exit from which the plastic film flows in tubular form together with a divider in the passage for dividing the plastic material during its flow into a plurality of spaced separated streams and subdividing each stream into a further plurality of side-by-side film segments, means for then joining the segments at their edges in tubular form, and merging means within the die for merging the tubes of each stream in concentric interfacial contact, with the result that the tubular structure emerging from the annular exit has a wall formed of a plurality of facially merged plastic layers. For improved strength and appearance, each edge joined area of one layer is covered by a film segment of the next tubular layer.

4 Claims, 9 Drawing Figures

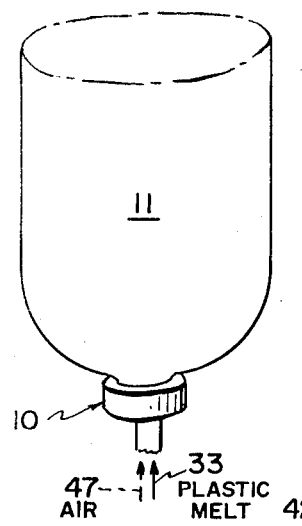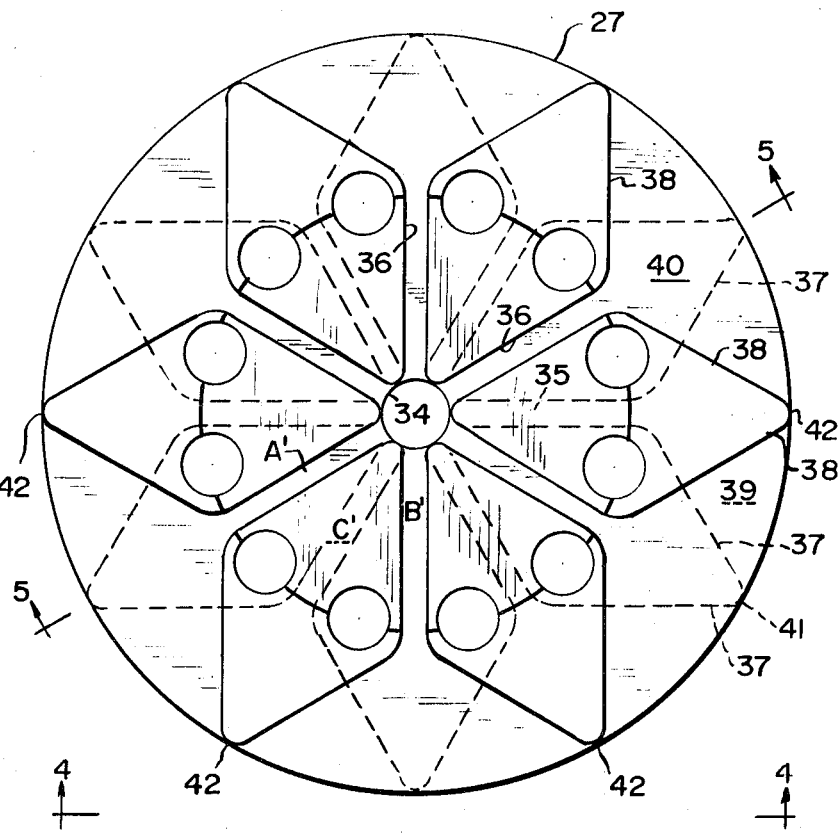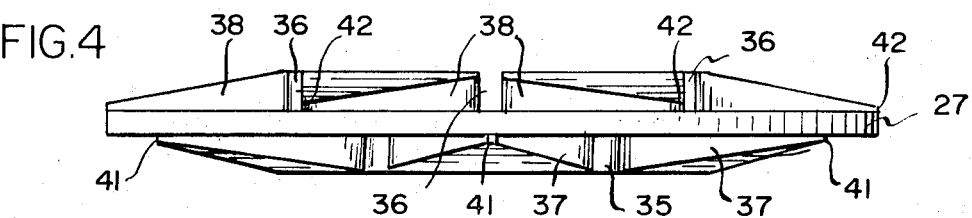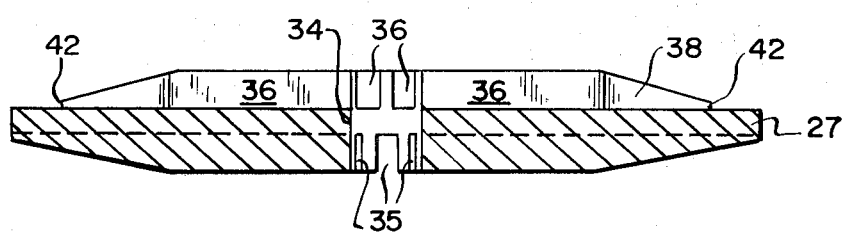

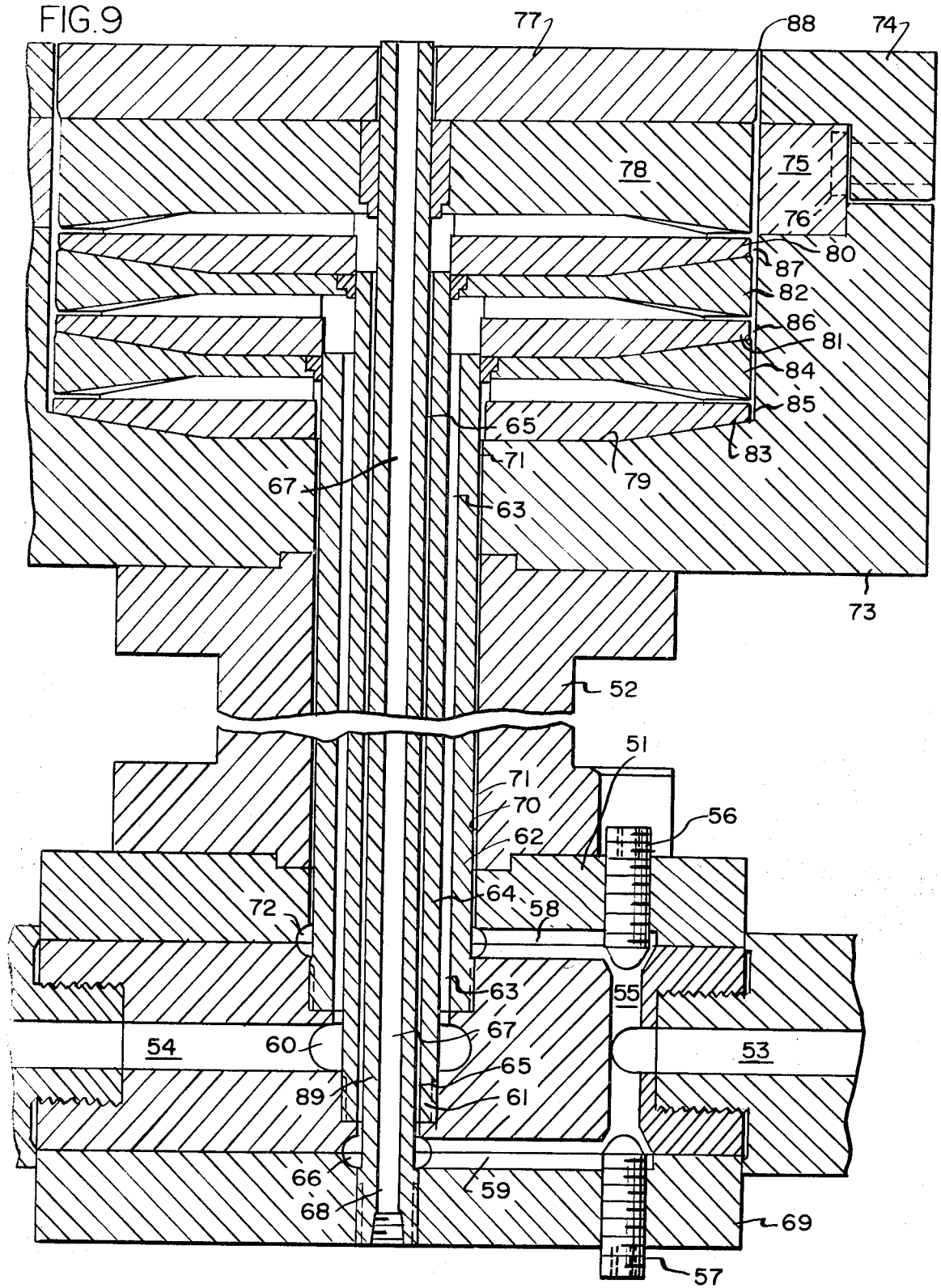

EXTRUSION DIE FOR PLASTIC FILM

One of the features of this invention is to provide an extrusion apparatus for producing plastic film rapidly and continuously with the resulting film being substantially uniform, strong and where the film is transparent of high clarity.

Another feature of the invention is to provide an improved method of producing a plastic film by extruding a mass of a flowable but hardenable plastic in which the plastic is divided into a plurality of separate streams each of which is shaped separately into a film and merging all the separate stream films in interfacial engagement prior to the hardening of the plastic.

Other features and advantages of the invention will be apparent from the following description of certain embodiments thereof as disclosed in the accompanying drawings. Of the drawings:

FIG. 1 is a semi-diagrammatic perspective view showing the relationship of the extruding die of this invention and a portion of the blown plastic film emerging therefrom.

FIG. 3 is a plan view of a spreader plate used in the die of FIG. 2 with certain details of the opposite side of the plate shown in dotted lines.

FIG. 4 is an edge elevational view of the spreader plate of FIG. 3 viewed substantially from line 4—4 of FIG. 3.

FIG. 5 is a sectional view taken substantially along line 5—5 of FIG. 3 which is a diameter thereof.

FIG. 8 is an enlarged diagrammatic edge view of a film produced with the die of this invention and showing the relationship of the joined film segments.

FIG. 9 is a fragmentary axial sectional view illustrating a further embodiment of the invention for making composite films from a plurality of supplies of plastic material.

Figure 2:
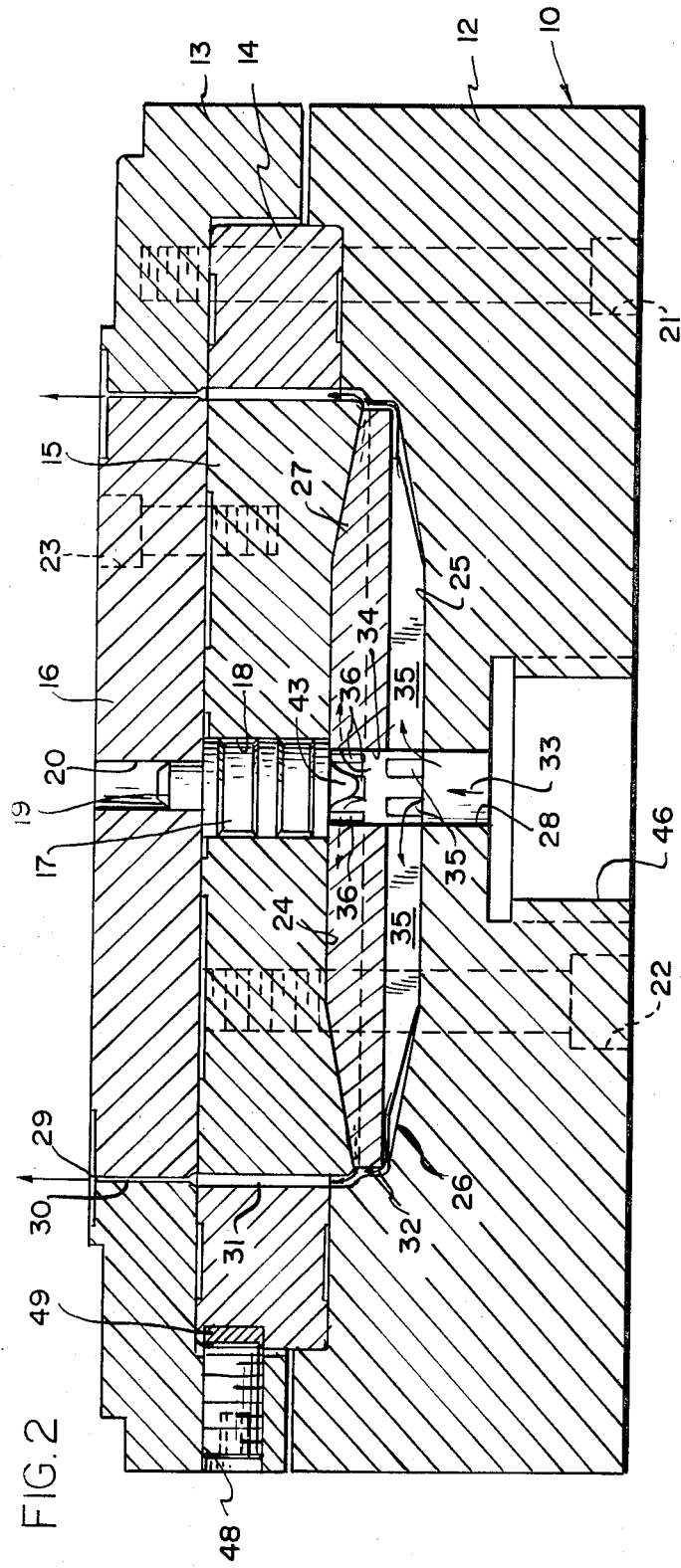
FIG. 2 is an enlarged vertical sectional view of an extruding die embodying the invention and omitting those parts which are not necessary for a proper understanding of the structure and operation of the die.

In extruding plastic film and particularly blown plastic film it is customary to extrude the plastic which is ordinarily a thermoplastic in melted flowable form through a die in which the film is shaped to a tubular formation so that it can be blown under internal air pressure to an enlarged diameter as illustrated in FIG. 1. As soon as possible, the blown film is chilled so as to become non-adherent to itself and to other objects.

Thus the die shapes the plastic in the tubular form and maintains the plastic in heated condition while within the die. Because the film is blown to greatly expanded size, it is necessary that the die form the film to close tolerances in order that the resulting blown film will have substantially uniform thickness.

Ordinarily, the blown film is formed of a synthetic organic thermoplastic material. When the plastic melt is of high viscosity which is true of polyethylene, for example, the plastic after being air blown can be chilled by contact with chilled air. In such instances the die assembly is ordinarily directed so that the emerging film passes vertically upwardly as illustrated in FIG. 1.

In the die of this invention the entire die may be rotated or can remain stationary during the extruding. The die divides the melt flow into a plurality of separate portions which in the illustrated embodiments are two in number and which are horizontal and vertically spaced from each other. The two portions are individually shaped to form films within the die and then are joined in interfacial merged contact before emerging from the die.

Before emerging from the die to form the inner and outer tubular portions, as described, each plastic portion or stream is further divided into film segments that are joined at adjacent edges.

As illustrated in the embodiment of FIGS. 1–5, the die 10, which is a center bottom fed die, from which the tubular plastic emerges for blowing into enlarged tubular form as illustrated at 11 in FIG. 1 comprises a base 12 of generally cylindrical form, a die ring 13 overlying the base, a die ring body 14 held between the base 12 and the ring 13, a die mandrel body 15 positioned within the ring body 14 and an overlying die mandrel 16 within the ring 13 and over and in contact with the die mandrel body 15.

The mandrel body 15 and the mandrel 16 are held in vertical alignment by a vertical pin 17 extending through a central cylindrical opening 18 in the mandrel body 15 and having a reduced upper end 19 which is cylindrical and retained within a similarly shaped opening 20 in the overlying mandrel 16.

All of the parts 12–17 are coaxial with each other and with the central vertical axis of the die 10 itself. Similarly, the reduced pin end 19 and the opening 20 in which it is received are also coaxial with each other and with the die axis.

The die parts are held in assembled relationship by three sets of bolts (not shown) one set of which is held in outermost circularly arranged openings 21, another set of which is held in spaced circularly arranged openings 22 that are concentric with but inwardly of the openings 21 and a third set of which are located in circularly arranged openings 23.

The first set of bolts in the openings 21 simultaneously bolts the die base 12, the die ring body 14 and the die ring 13 into a strong unitary assembly. The second set of bolts in the openings 22 hold the spreader plate 27 between the die mandrel body 15 and the base 12. The third set of bolts in the openings 23 ties together the mandrel body 15 and the mandrel 16.

The confronting faces 24 and 25 of the mandrel body 15 and the base 12, respectively, are spaced from each other to provide a chamber 26 in which is located a melt spreader plate 27. The opposite sides shown in the drawings as the upper and lower portions of the spreader plate form parts of a passage means through the die having an entrance 28 that axially coincides with the central axis of the die 10 itself and an annular exit 29 from which the plastic material flows preparatory to being blown into an expanded cylinder as shown diagrammatically in FIG. 1. The portions of the passage means approaching the exit are annular and are formed as indicated by the passage 30 by spacing the outer circumference of the mandrel 16 from the inner circumference of the ring 13. This passage 30 is a continuation of a somewhat wider passage 31 formed by spacing the outer circumference of the mandrel body 15 from the outer circumference of the die ring body 15. The inner end of this passage 31 merges into the outer circumference 32 of the previously described inner chamber 26.

The film forming means in the disclosed embodiments of the invention comprises dividing means in the passage means for dividing the plastic material in the die into a plurality of spaced separated streams. In the disclosed embodiment this is accomplished by spreader plate 27. Thus, as disclosed, the upward flow of plastic material in the entrance 28 as indicated by the arrow 33 enters a central vertical opening 34 in the plate 27. Extending radially from this vertical opening 34 are two sets of radial passages 35 and 36 with one set being located on one surface, here shown as the bottom surface, and the other set 36 on the opposite surface.

As these passages radiate outwardly from the axial center of the die 10, they of course extend from the entrance to the die toward the annular exit 29. As is illustrated in FIGS. 3, 4 and 5, each passage 35 on the one surface of the plate and each passage 36 on the opposite surface has a narrow portion which, as shown, is of substantially uniform cross section that is adjacent the entrance 28 of the die and an outwardly flared portion formed by outwardly flared side walls 37 on the one surface of the plate 27 and similarly outwardly flared portions formed by similar flared side walls 38 on the opposite side of the spreader plate. These resulting outwardly flared portions 39 and 40 of the radially extending flow passages 35 and 36 are substantially joined at their outer edges as shown most clearly in FIG. 3.

The result of this is that each of the two streams on opposite sides of plate 27 is further subdivided by passages 35 and 36 with their flared outer ends into substreams. Each resulting substream flows first radially in its narrow passage 35 and 36 and then spreads outwardly toward the periphery in the flared spreader plate portions 39 and 40 where they are joined at the edges 41 and 42.

As can be seen from FIGS. 3-5, each passage 35 and 39 is offset from the corresponding passage 36 and 40 on the opposite side of the plate. This means that each weld area where the film segments are joined opposite a spreader plate area 41 or 42 is covered by the segment film of one of the streams. In other words, the weld areas on the inner and outer surfaces of the film 11 are staggered with relation to each other so that each film segment joined area on the inner surface of the plastic tube is reinforced by an overlying film segment on the outer surface of the blown tube and vice versa.

In order to aid in dividing the inflowing plastic material indicated by the arrow 33 into the two vertically spaced radiating streams the bottom end of the pin 17 that is within the spreader plate opening 34 is provided with a lower generally conical end 43 that extends downwardly at the top of the vertical opening 34.

Figure 7:
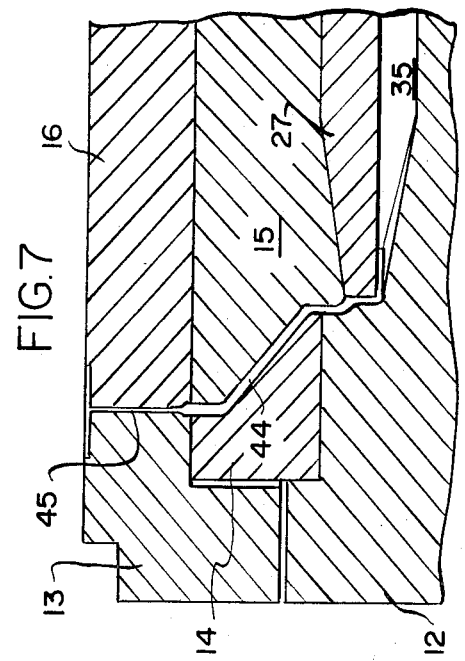
FIG. 7 is a view similar to FIG. 6 but illustrating another embodiment of the invention.
Figure 6:
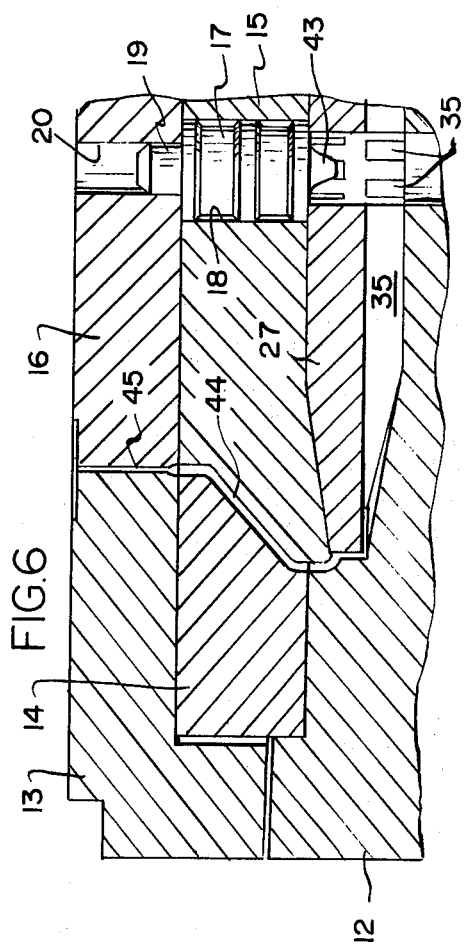
FIG. 6 is a fragmentary edge view similar to a portion of FIG. 2 but illustrating a second embodiment of the die.

As shown in FIGS. 6 and 7, the die can be easily adjusted for extruding film tubes of different diameters. Thus in the illustrated embodiment of FIG. 2 the film emerging from the annular exit 29 is an 8 inch tube. When a smaller tube is desired, the same spreader plate 27 and the same die base 12 are used as well as the same pin 17. It is only necessary to change the dimensions of the die ring 13, ring body 14, mandrel body 15 and mandrel 16 to those providing smaller diameter passages 44 and 45. Similarly, when it is desired to produce a larger emerging tube it is only necessary to change the parts 13–16 to those of larger size as illustrated in FIG. 7.

As stated above, the parts of the die are securely fastened together by the three sets of bolts held in the circularly arranged openings 21, 22 and 23. In the illustrated embodiment there are 12 bolts in each set.

In order to adjust the spacing and thus the width of the passage 31 there are provided adjusting means illustrated by the equally spaced threaded openings 48 for retaining adjusting bolts (not shown) each of which is adapted to bear at its inner end on a hardened steel insert 49 in the outer periphery of the ring body 14. In FIG. 2 there is only one of these openings 48 and inserts 49 shown, although in this embodiment there are actually four spaced 90° apart.

The operation of the die of this invention is believed obvious from the above description. However, to summarize, the die 10 may be rotated in use by a rotating means (not shown) to which the die is attached by means of the recess 46 on the lower surface of the die. During rotation the heated thermoplastic material such as polyethylene or other plastic material is forced under pressure through the entrance 28 and is divided by the spreader plate 27 into two separate streams one of which flows radially outwardly from the central axis of the die on one side of the plate and the other of which flows similarly outwardly on the other side of the plate. Each separate stream is divided into segments for flow through the sets of passages 35 and 39 and 36 and 40. As each segment flows outwardly through its passage it is shaped as a separate film segment and joined at its edges on leaving the periphery of the spreader plate 27 and entering the passage 31 on the way to the exit passage 30. The separate streams thereby become merged in interfacial engagement with the one stream being on the inner side of the extruded tubular plastic and the other on the outer side. After emerging from the die 10 as illustrated in FIG. 1 the tubular plastic which is still heated and soft is blown in the customary manner by air or other gas as illustrated diagrammatically at 47 in FIG. 1.

The embodiment of the invention illustrated in FIG. 9 is a structure for producing a composite film comprising layers of plastic material from a plurality of sources. In this embodiment the apparatus comprises a stationary base part 51 and a rotatable top part 52 interconnected by a customary rotary joint (not shown). In the base part 51 there is a first radial passage 53 for supplying a flowable plastic material such as a melted plastic from one source such as an extruder and a second radial passage 54 for supplying a second flowable plastic material as from a second extruder. For simplicity of illustration, the two extruders are not shown as they are merely customary apparatus in this art.

The first passage 53 leads into a vertical passage 55 in the base 51 with the ends of this passage 55 being closed by adjustable screw threaded plugs 56 and 57 that are accessible from the exterior of the base 51. From the upper end of the vertical passage 55 in the vicinity of the inner end of the plug 56 there is an inwardly extending passage 58 while from the lower end of the vertical passage 55 adjacent the other adjustable plug 57 there is a similar radial passage 59. Thus the plastic material flowing inwardly of the first passage 53 is divided into two parts each of which first flows vertically and then horizontally inwardly in the respective passages 58 and 59. The adjustable plugs 56 and 57 are for adjusting the cross sectional area of each flow passage 55, 58 and passage 55, 59 and thereby adjusting the rate of flow through these flow passages.

The opposite or second radial passage 54 leads inwardly to an annular passage 60 surrounding a cylindrical tube 61. The outer surface of this tube 61 and the inner surface of an outwardly adjacent but spaced tube 62 defines an annular flow passage 63 extending upwardly in the apparatus and communicating at its bottom end with the passage 60.

The cylindrical inner surface of the tube 61 is spaced from the cylindrical outer surface of another cylinder 64 to provide an annular passage 65 that communicates at its bottom with an annular passage 66 which is positioned to receive plastic material from the lower radial passage 59. The cylindrical tube 89 has a central opening 67 to provide an axial air feed passage.

The outer surface of the cylindrical tube 62 is spaced from a cylindrical surface 70 in the base part 51 to provide an outer annular passage 71 whose lower end communicates with an annular passage 72 that is positioned to receive flowing plastic material from the inner end of the upper radial passage 58.

As can be seen from the bottom portion of FIG. 9 the base part 51 of the device is made in several separable parts for ease in assembly and disassembly. Again, as in the other embodiments, certain elements not essential to the invention have been omitted.

The FIG. 9 embodiment provides a plurality of concentric flow passages 65 and 71 both of which are supplied by the first radial supply passage 53 and an intermediate cylindrical passage 63 between the passages 65 and 71 with the intermediate passage 63 being supplied by the other radial supply passage 54.

The upper portion 52 of the embodiment of FIG. 9 comprises the rotatable die part. This top part 52 has mounted thereon the die base 73 that is similar to base 12 of the embodiment of FIG. 2. Positioned on top of this base 73 is a die ring 74 similar to the ring 13. Enclosed by the ring 74 is a ring body 75 carrying the four equally spaced pressure pads 76, the ring body and pressure pads being similar to corresponding elements 14 and 49 in the earlier embodiment.

Positioned within the die ring 74 at the top of the device is a die mandrel 77 which together with the ring body 75 enclose the die mandrel body 78. Beneath the die mandrel body 78 within the base 73 is a cylindrical hollow 79. In this hollow 79 are positioned three spreader plates in vertically spaced relationship with the top plate 80 being beneath the die mandrel body 78 and separated from the next lower or center spreader plate 81 by another die mandrel body 82. This center spreader plate 81 is separated from the bottom spreader plate 83 by another mandrel body 84 similar to the mandrel body 82. In this embodiment each of the spreader plates 80, 81 and 83 are constructed and function similarly to the spreader plate 27 of the previously described embodiment.

In this embodiment of FIG. 8 the outer annular plastic material passage 71 that receives one of the divided streams of material from the first radial passage 53 is joined at its upper end to the radiating top and bottom spreader passages in the lowest plate 83. The intermediate annular plastic material passage 63 which receives its plastic material from the other radial inlet passage 54 communicates at its upper end with the upper and lower radial flow passages in the central spreader plate 81. The innermost cylindrical plastic passage 65 which receives its material from its divided stream 59 leading from the first radial passage 53 communicates at its upper end with the upper and lower film forming passages in the top spreader plate 80.

The result is that the spreader plates 80, 81 and 83 produce a tube and then from this tube a resulting plastic film made up of three composite layers in which the two surface layers are formed by the plastic material from the inlet passage 53 and with the intermediate film layer being formed by the spreader plate 81 which receives its material from the intermediate cylindrical flow passage 63 which in turn is supplied through the other radial inlet passage 54.

The outer layer of the composite structure which is formed by the lowest or first spreader plate 83 is produced from the two film streams that are merged in face-to-face contact in the film joining area 85 at the periphery of the plate 83 in the manner previously described in connection with spreader plate 27. Then the intermediate or core layer is formed by the merging streams at the periphery of the intermediate spreader plate 81 in the film joining area 86. In this area also this intermediate layer is joined in facial contact to the inner surface of the outer layer that is progressing upwardly from the cylindrical area 85. Then the other or innermost surface film of the composite structure is formed in a similar manner in the film joining area 87 that is located at the periphery of the top spreader plate 80. In this space 87 the thusly produced film is of course joined to the inner surface of the two layer composite structure which is progressing upwardly from the lower spaces 85 and 86. Finally, the thusly produced composite structure emerges from the annular exit 88 in tubular form, as previously described in connection with the annular exit 29 of the first embodiment and as shown generally in FIG. 1.

Because the composite structure is gradually increasing in thickness, as it proceeds through and from the die, the first or lowermost film forming area 85 is of the narrowest width, the next area 86 is somewhat wider and the final area 87 is the widest.

The extrusion apparatus and method of this invention have a number of very important advantages. By dividing the plastic material in the die into a plurality of streams and by further dividing each stream into a plurality of segments which are then joined at their edges at substantially the same time the streams are joined in emerging from the die very close and accurate control is obtained over the dimensions and the strength of the resulting film. The joined areas of the separate stream segments which would ordinarily be weakened areas and which would tend to develop haze are strengthened and haze is substantially prevented by having a segment of one stream of the plastic overlying and reinforcing the joined areas of the film segments of the next stream with which it is in facial merged contact. The result is that the blown film 11 emerging from the die has no readily visible weld areas and where the plastic material is transparent the transparency is maintained during and after the blowing.

With the die of this invention it is very easy to change the die to produce plastic tubes of different diameters as it is only necessary to change a very few parts as is illustrated by comparing FIGS. 6 and 7 with FIG. 2. In addition, the parts of the die are simple to produce as the machining required is quite simple with an absence of complex surfaces. Because the parts are held together by a very small number of sets of bolts it is easy to disassemble and reassemble the parts as in cleaning the die. The die is also very strong and stable even when subjected to high internal fluid pressures because of the simplicity of the parts and the sturdy construction of each part.

Because of the small volume of the internal passages in the die there is only a small amount of plastic material left in the die to purge. Also, because of this, the dwell time of the plastic passing through the die is very short as the flow passages are not only of small total volume but also of a short total length from the entrance 28 of the die to the annular exit 29. The pressure drop of the plastic material flowing through the die is correspondingly reduced.

The die of this invention has no areas for stagnation and degradation of the plastic melt and the temperature of the melt passing through the die is maintained so that the fluidity of the plastic is maintained. Due to the structure of the die the plastic material in the die has increased melt strength and improved bubble stability with relatively low melt temperatures. All this reduces the amount of scrap produced as there is less bubble snap-offs caused by low melt strength and instability. There are also fewer wrinkles produced in the film which would be caused by bubble instability and poor gauge.

Due to the substantial elimination of stagnant areas of melt flow and heat degrading of the plastic, there are substantially no gels and specks produced in the resulting film. The lower melt temperatures and better bubble stability of the film produced by the die and method of this invention produces a great improvement in the quality of the film particularly in gauge and size. Because of the overlay of the weld lines by an unbroken segment of film, as described, the physical strength of the film is greatly improved as well as its optical appearance and surface smoothness.

By having substantially no areas for stagnation and accumulation of sizable amounts of plastic within the die it has been found that the die purges itself rapidly and cleanly when changing the plastic material so that there is a minimum of scrap produced.

With the die of this invention the weld lines or areas extend only a fraction of the way through the thickness of the film, so that each weld is concealed and strengthened by the overlap material made up of the remainder of the film thickness. The thusly concealed weld lines or areas thereby alternate from side surface to side surface of the film across the entire width of the finished film as illustrated in FIG. 8 and are equal in number to the separately produced and then joined film segments identified as A, B and C in FIG. 8 which emerge from corresponding die passages A', B' and C' identified in FIG. 3.

Having described my invention as related to the embodiments shown in the accompanying drawings, it is my intention that the invention be not limited by any of the details of description, unless otherwise specified.

I claim:

1. Extrusion apparatus for producing plastic film, comprising: a die having a passage means therethrough with an entrance and an annular exit for flowable plastic material; dividing means in said passage means for dividing said material into a plurality of spaced separated streams; a plurality of film forming means for arranging said streams in separate films; and merging means for merging said films in interfacial merged tubular form prior to reaching said exit, said die having a central axis with which said passage entrance and annular exit are concentric, with said plurality of streams spaced along said axis, each said film forming means comprising a plurality of adjacent passages radiating from said axis, and with each said passage having a straight portion of substantially uniform width adjacent said axis and an outwardly flared portion at said annular exit, said flared portions for each said film forming means being coplanar in a plane that is at substantially right angles to said axis.

2. Extrusion apparatus for producing plastic film, comprising: a die having a central axis and a passage means through the die with an entrance and an annular exit for flowable plastic material, the entrance and exit being concentric to each other and to said axis; dividing means in said passage means for dividing said material into a plurality of separated streams spaced along said axis; separate film forming means for arranging said streams in separate films with each film forming means comprising means providing a plurality of adjacent passages radiating from said axis in which each said passage has a straight portion of substantially uniform width adjacent said axis and an outwardly flared portion at said annular exit, said flared portions for each film forming means being coplanar in a plane that is at substantially right angles to said axis and being in an adjacent series with their outer edges merged in intermingling areas at said annular exit, the intermingling areas of one said stream dividing means being angularly offset from the intermingling areas of the next stream dividing means; and merging means for merging said films in interfacial merged tubular form prior to reaching said exit.

3. Extrusion apparatus for producing plastic film, comprising: a die having a passage means therethrough with an entrance and an annular exit for flowable plastic material, dividing means in said passage means for dividing said material into a plurality of spaced separated streams; film forming means for arranging said streams in separate films with each film forming means comprising a plurality of adjacent passages extending from said entrance toward said annular exit, said dividing means comprising a spreader plate in said die having opposite side surfaces each provided with a plurality of said film forming passages, said die comprising separable parts cooperating to form a chamber means in which said spreader plate is located with an outer wall of said chamber and the outer edge of said plate being located at said annular exit, said die having a central axis and said passages on each side of said plate radiating outwardly from said axis, each said passage having a narrow portion adjacent said entrance and an outwardly flared portion from the narrow portion to said annular exit, the outer extremities of said flared portions merging at said annular exit, said flared portions being in an adjacent series with their outer edges in intermingling areas at said annular exit with said areas of one said stream dividing means angularly offset from those of the next stream dividing means; and merging means for merging said films in interfacial merged tubular form prior to reaching said exit.

4. The apparatus of claim 1 wherein said flared portions are in an adjacent series with their outer edges merged in intermingling areas at said annular exit.

* * * * *